United States Patent Office.

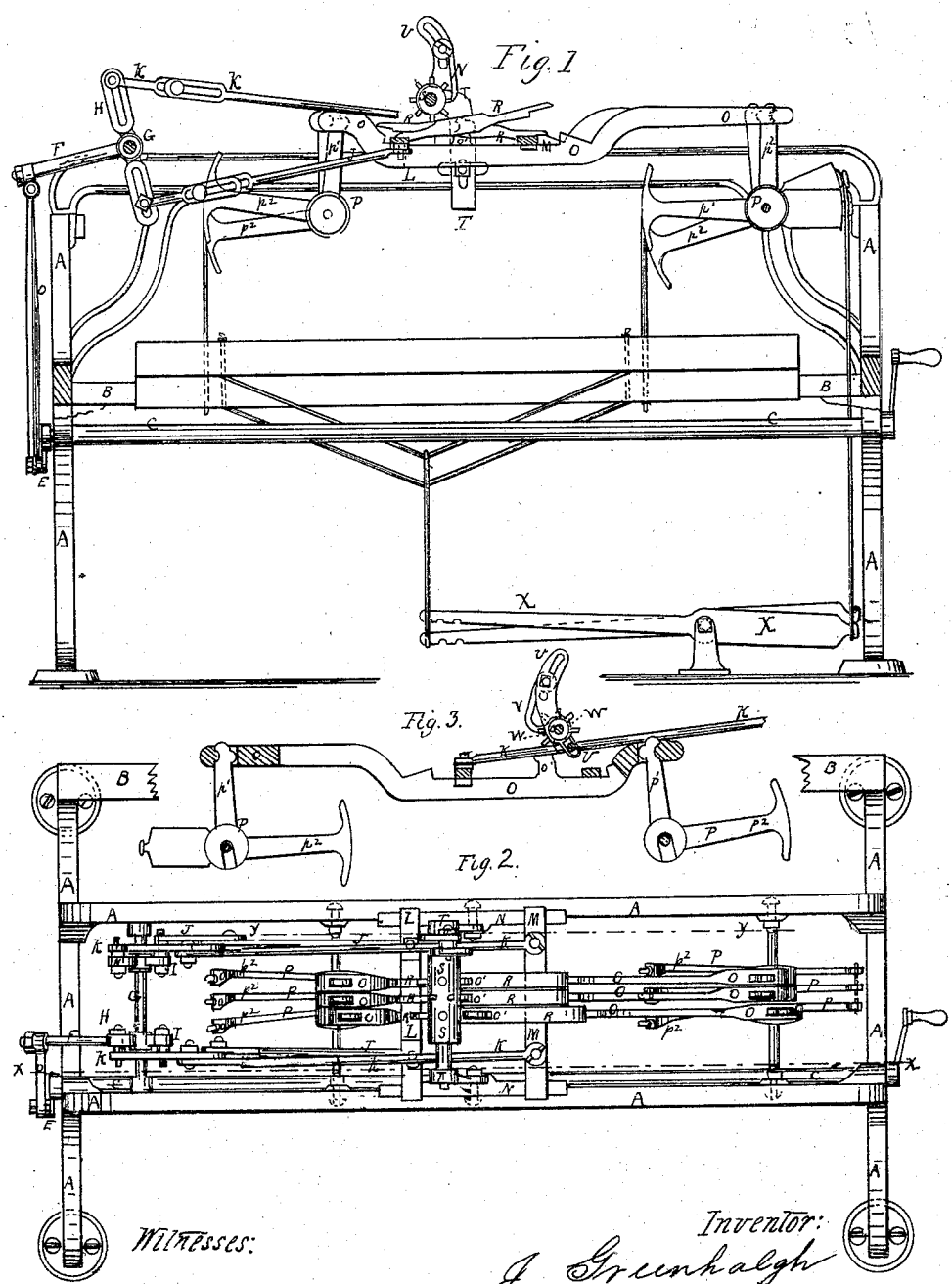

JAMES GREENHALGH, OF WOONSOCKET, RHODE ISLAND.

Letters Patent No. 74,819, dated February 25, 1868.

IMPROVEMENT IN HARNESS-MECHANISM FOR LOOMS.

The Schedule referred to in these Letters Patent and making part of the same.

TO ALL WHOM IT MAY CONCERN:

Be it known that I, JAMES GREENHALGH, of Woonsocket, in the county of Providence, and State of Rhode Island, have invented a new and useful Improvement in Harness-Motion for Looms; and I do hereby declare that the following is a full, clear, and exact description thereof, which will enable those skilled in the art to make and use the same, reference being had to the accompanying drawings, forming part of this specification, in which—

Figure 1 is a side view of my improved loom, partly in section, through the line $x\ x$, fig. 1.

Figure 2 is a top view of the same.

Figure 3 is a detail sectional view of the same, taken through the line $y\ y$, fig. 2.

My invention has for its object to improve the construction of the parts by means of which motion is imparted to the harness, so as to simplify their construction, and make them more effective in operation.

A is the frame of the loom; B is the breast-beam, and C is the driving-shaft; D is a connecting-rod, the lower end of which is pivoted to a crank, E, formed upon or attached to the end of the shaft C, and the upper end of which is pivoted to the outer end of the arm F, which is rigidly connected with the shaft G, which works in supports or bearings attached to the frame A. To the shaft G are also rigidly attached the slotted arms H and I, projecting from opposite sides of said shaft, as shown in figs. 1 and 2. To the slotted arms H and I are adjustably pivoted the ends of the connecting-rods J and K, the other ends of which are connected to the sliding cross-bars L and M, which rest and slide upon the slides N, attached to the upper part of the frame A. The rods J and K are made in two parts, the adjacent ends of which parts are slotted, overlap, and are secured to each other by bolts and nuts, as shown in the drawings. By this construction, the length and throw of said rods may be adjusted at pleasure. O are the links, the ends of which rest upon and are pivoted to the ends of the upright arms $p^1$ of the upper jacks P. The links O are made in the form shown in figs. 1, 2, and 3, and are placed directly beneath the sliding cross-bars L and M, so that they may be operated by the said sliding cross-bars. R are the hooks, which are pivoted to a projection or tenon, $o'$, formed upon the upper edge of the middle part of the links O, and which enter and work in mortises or slots in the said hooks. The ends of the hooks R, upon their under sides, have notches or shoulders formed upon them, which take hold of the sliding bars L and M, so as to cause the links O to move with the said sliding bars, operating the harness. The tenons and slots by which the links O are pivoted to the hooks R and to the arms $p^1$ of the jacks P, are made of a peculiar form, which is shown in fig. 3, so that the said parts may be held securely in place, while operating, and at the same time may be easily detached from each other when desired. One end of the hooks R is made heavier than the other end, so that when left free the heavier end will always rest upon one of the sliding bars, as M, from which it is removed, and the other end of the hook brought into contact with the other bar, as L, at the proper time, by the pins attached to the cylinder S.

In the drawings, the hooks R are represented as being operated by pins attached to the cylinder S, but I prefer to operate them by an endless chain passing around said cylinder in the ordinary manner. The cylinder S revolves in bearings or supports, T, adjustably attached to the frame A, as shown in fig. 1. U is an arm, working loosely upon one of the journals of the cylinder S, and projecting upon both sides. The lower end of the arm U is slotted, and in the said slot works a pin, attached to one of the connecting-rods, K. In the other or upper end of the arm U is formed a curved slot, in which is adjustably secured the pin, to which the pawl V is pivoted. The pawl V takes hold of the ratchet-wheel W, formed upon or attached to the end of the cylinder S, so that the said cylinder may be operated directly from the connecting-rod K. The ends of the arms $p^2$ of the jacks P, to which the harness is connected, are made in the form of segments of circles, the centres of which are the pivoting-points of said jacks, so that the harness may always move up and down vertically. One set of the upper jacks is connected with the lower jacks X, so that the harness may always be kept taut while being moved up and down.

I claim as new, and desire to secure by Letters Patent—

1. The links O and hooks R, constructed as described, when removably pivoted together by means of the notched pivot and slot $o'$, in combination with the slides L M, cylinder S, as herein described for the purpose specified.

2. The combination and arrangement of the arms F H I, adjustable connecting-rods J K, sliding bars L M, links O, hooks R, cylinder S, pawl V, slotted arm U, and upper jacks P, with each other, substantially as herein shown and described.

JAMES GREENHALGH.

Witnesses:
GEORGE BENTLEY,
J. P. CHILDS.